F. J.-B. DAMAIZIN.
MOTOR VEHICLE FOR AGRICULTURAL PURPOSES.
APPLICATION FILED FEB. 24, 1919.
1,325,277.
Patented Dec. 16, 1919.
3 SHEETS—SHEET 2.
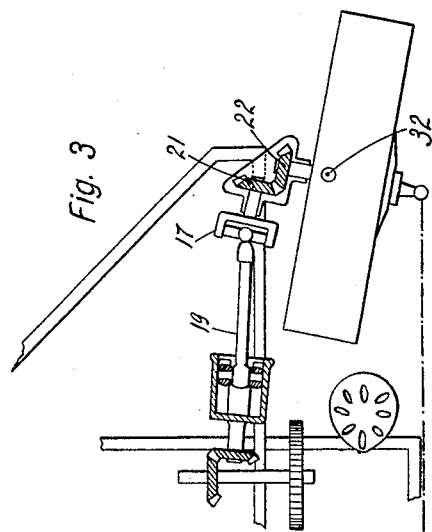
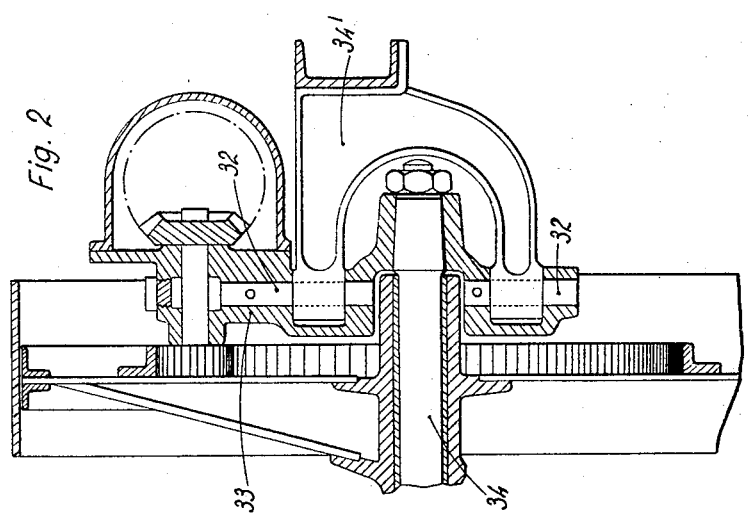
Inventor.

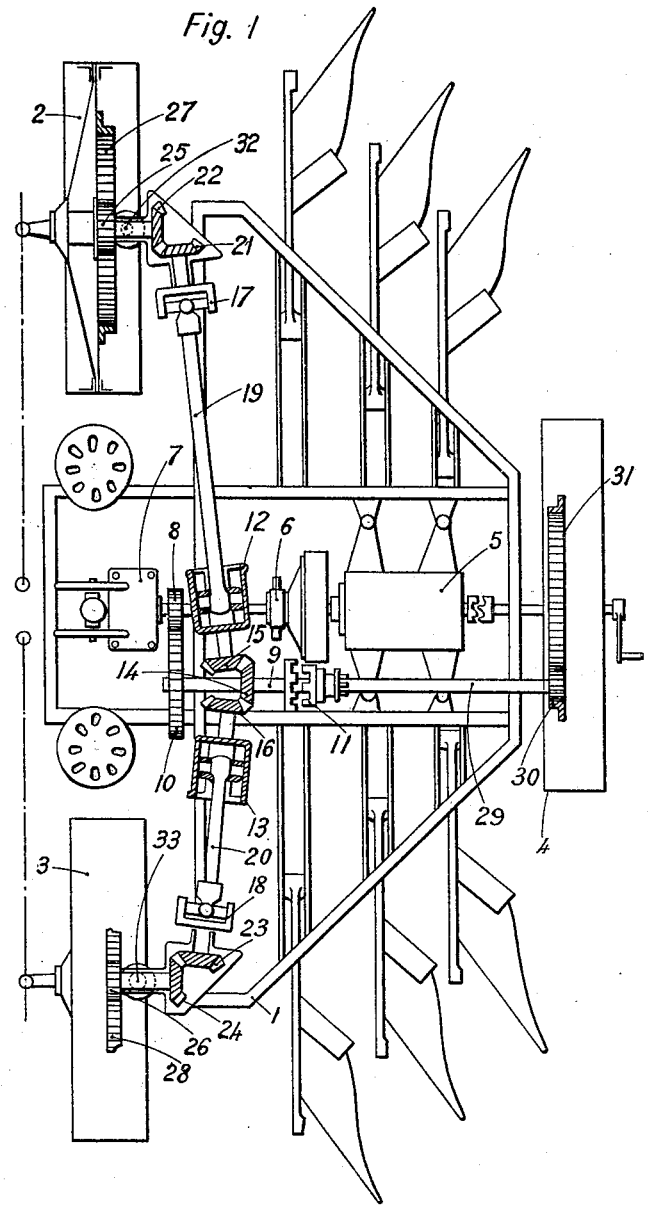

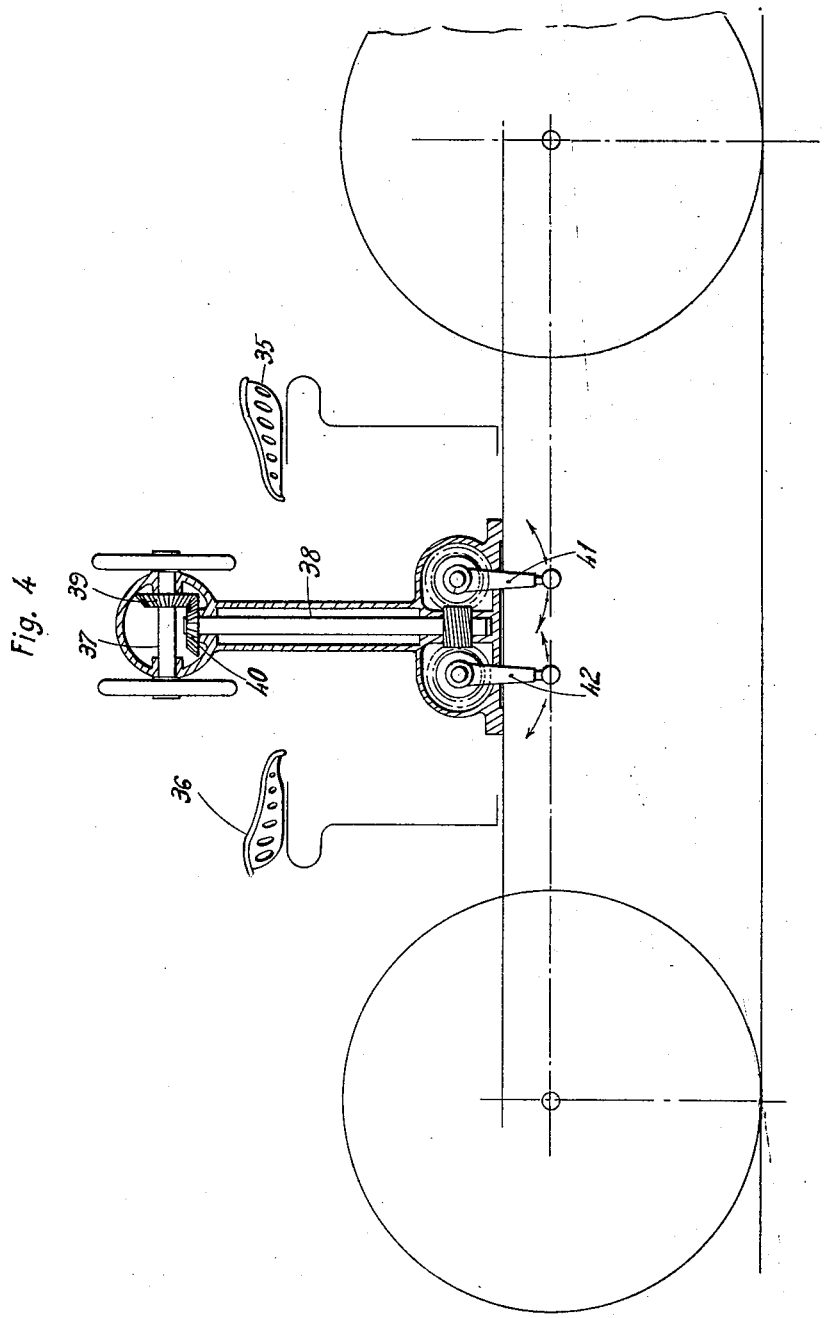

UNITED STATES PATENT OFFICE.

FREDERIC JEAN-BAPTISTE DAMAIZIN, OF PARIS, FRANCE.

MOTOR-VEHICLE FOR AGRICULTURAL PURPOSES.

1,325,277.  Specification of Letters Patent.  Patented Dec. 16, 1919.

Application filed February 24, 1919. Serial No. 278,954.

*To all whom it may concern:*

Be it known that I, FREDERIC JEAN-BAPTISTE DAMAIZIN, citizen of the French Republic, residing at Paris, Department of the Seine, in France, and whose post-office address is 19 Rue Poussin, in the said city, have invented certain new and useful Improvements in Motor-Vehicles for Agricultural Purposes; and I do hereby declare the following to be a full, clear, and exact description of the invention, such as will enable others skilled in the art to which it appertains to make and use the same.

The motor vehicle for mechanically working the soil, which forms the object of the invention, carrying plows or other agricultural implements is arranged to operate both in a forward and backward direction and is characterized by the following features, which will be readily understood from the present specification taken in conjunction with the annexed drawings.

In said drawings Figure 1 is a plan view of the apparatus, the motor and certain appertaining parts being omitted for clearness.

Fig. 2 is a section showing in detail the pivoted axle of the steering wheels.

Fig. 3 shows the arrangement of the Cardan shafts and their movement when the wheels are sleeved for turning.

Fig. 4 shows in elevation the preferred arrangement for controlling the steering of the two wheels.

The apparatus comprises a substantially triangular chassis 1 (Fig. 1) supported by land wheels 2, 3, 4; the first two which act both for driving and steering being placed at the extremities of the longer side of the triangle while the wheel 4, which constitutes the center wheel is arranged to revolve on an axle secured to the chassis at the apex of the triangle facing the longer side. The drive to this latter wheel can be disconnected in order to facilitate the steering of the vehicle.

On the chassis are arranged the motor 5, a clutch 6 and a gear box 7 with reversible gear. The pinion 8 driven from the gear box transmits motion to the central shaft 9 by means of the gear wheel 10. The shaft 9, by means of the claw coupling 11, transmits motion to the wheel 4 and also transmits motion to the shafts 12 and 13 by means of the bevel gears 14, 15, 16. The shafts 17 and 18 coupled to the ends of the Cardan shafts 19 and 20, transmit movement through bevel gears 21, 22, 23, 24 to the driving pinions 25 and 26 which drive the wheels 2 and 3 by means of the crown gears 27 and 28. The shaft 29 which is an extension of the central shaft 9, when the claws of the coupling 11 are engaged, transmits motion to the wheel 4 by means of the toothed pinion 30 driving the gear 31 which is integral with the wheel 4.

Steering is accomplished by rotating the wheels 2 and 3 around the axles 32 and 33. the construction of which is described in the following paragraph. The shafts 17 and 18 follow the pivotal movement of the wheels and cause the shafts 19 and 20 to move correspondingly. To allow of this movement, the shafts 12 and 13 are extensible and the length of the sheath is sufficient to enable turning of the wheels in the two directions (Fig. 3).

Fig. 2 shows in detail the pivotal axle receiving the transmission from the Cardan shaft which has just been described; the pivotal axle 32 is firmly secured in a support 33 carrying the axle 34 of the steering wheel. The support 33 pivots between the branches of the fork 34' which is fast on the chassis and all the transmission means which are connected to it follow it, in all its movements.

The position of the driver for the two directions of running is indicated by the seats 35 and 36 (Fig. 4). Steering is effected by rotating the horizontal shaft 37 by either of the two hand wheels thereon. The horizontal shaft 37 being rotated transmits the motion to the vertical shaft 38 by means of the gears 39 and 40; motion is then given to the two steering wheels by two levers 41 and 42 rotated by a worm gear or other suitable device; two jointed connecting rods connect the control levers to the ends of the wheel 2, 3.

I claim:

1. In a motor vehicle, the combination with a frame, of a pair of supporting wheels arranged in alinement with each other, a guiding wheel arranged laterally with respect to the first-mentioned wheels, a driving unit, gearing actuated by said driving unit, longitudinally extensible shafts between said gearing and said supporting wheels, means for clutching and unclutching said supporting wheels and guide wheel to the driving unit, and means for moving the supporting wheels about axes at right angles to their axes of rotation to steer the vehicle, said turning being permitted by the extensible shafts.

2. In a motor vehicle the combination with a frame of a pair of supporting wheels arranged in alinement with each other, a guiding wheel arranged laterally with respect to the first mentioned wheels, a driving unit, means for clutching and unclutching said unit to the two alined wheels and means independently operable for clutching and unclutching the laterally spaced wheel to the driving unit.

In testimony whereof I affix my signature.

FREDERIC JEAN-BAPTISTE DAMAIZIN.